May 21, 1935.  E. U. ROLAND  2,002,237

FRYING PAN COVER

Filed June 7, 1933

INVENTOR.
Esten U. Roland.
BY
ATTORNEY.

Patented May 21, 1935

2,002,237

UNITED STATES PATENT OFFICE 2,002,237

FRYING PAN COVER

Esten U. Roland, Shiloh, Ohio

Application June 7, 1933, Serial No. 674,666

2 Claims. (Cl. 53—7)

This invention relates to covers for pans and other cooking utensils.

In cooking food in a utensil, for example frying meat in a pan, it is desirable to allow the escape of moisture from the pan in the form of steam. Particularly is this true in frying meat because it not only improves the quality of the meat as food but enables it to be browned. However, meat cooked in an open pan will spatter grease over the stove and upon the cook.

It is an object of this invention to provide an improved cover for pans and the like which will effectively prevent the escape of spattered grease from the pan and at the same time allow the escape of moisture therefrom.

Another object is to provide a cover for pans and the like having improved means to collect grease spattered from food cooking in the pan and return it to the pan.

Another object is to provide a utensil cover of the class referred to which can be formed by simple cutting, pressing and stamping operations from sheet metal.

Another object is to provide such a cover which will be so cheap to manufacture as to admit of its being sold in five and ten cent stores whereby it may go into general use.

Another object is to provide a pan cover of the class referred to having contours which will render it neat in appearance and easily cleaned.

Other objects will be apparent to those skilled in the art to which my invention appertains.

My invention is fully disclosed in the following description taken in connection with the accompanying drawing, in which:—

Figure 1:
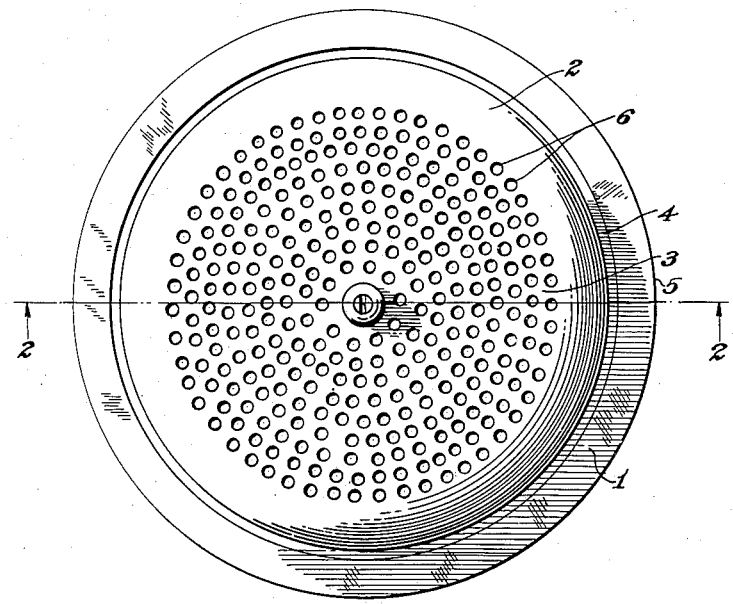
Fig. 1 is a top plan view of an embodiment of my invention.
Figure 2:
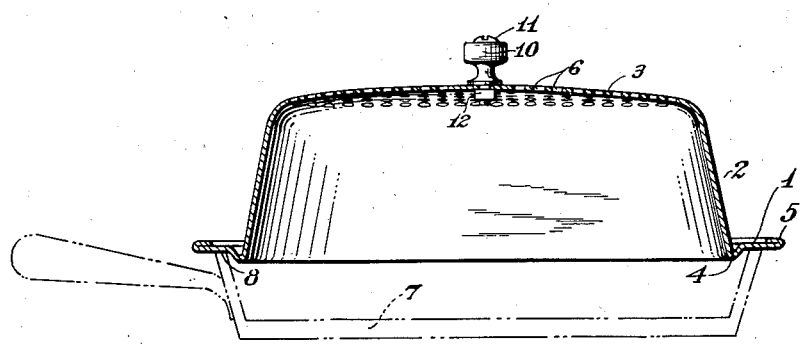
Fig. 2 is a cross-sectional view of the cover of Fig. 1 showing its mode of use in connection with a pan such as a frying pan.

Referring to the drawing, I have shown at 1 a circular annular flange, supporting an upwardly extending generally frusto-conical wall portion 2 surmounted by a dome portion 3.

Between the flange portion 1 and side portion 2, a downwardly extending annular bead 4 may be provided. The outer annular edge of the flange 1 may be folded over as at 5 if desired.

The dome portion 3 is provided with a plurality of perforations 6.

The pan thus briefly described may be made from sheet metal.

The preferred form of procedure is to cut first a blank such as a circular blank from a sheet of metal and to punch therein the perforations 6—6. The blank is then placed in a press-forming die and by a single stroke of the press is given the shape indicated in the drawing and as above described, with the exception of the turned-over edge portion 5. This edge portion 5 may be omitted if desired but where it is wanted it can be applied by a subsequent operation such as a spinning operation.

To those skilled in the art of pressing sheet metal it will be at once apparent that the cover may be formed by a single pair of dies. This rests upon the fact that proceeding from the center of the cover, it is concave in the downward direction only and is of larger and larger diameter at all points proceeding from the center of the dome portion 3. Thus, the die draft is all in one direction and a single pair of male and female dies may be employed and the entire operation performed by a single stroke of the forming press.

The flange 1 is substantially in the original plane of the sheet metal.

In operation, the cover is placed upon a pan, indicated in broken lines at 7, and the bead 4 is of such diameter as to fit substantially just inside of the upper peripheral rim 8 of the pan and with the flange 1 resting upon the pan periphery, as illustrated. All parts of the cover are thus supported above any food which may be in the pan; and the rim portion 5 seals the pan at the rim portion and thus all moisture emanating from the food in the pan can escape only by way of the perforations 6—6.

Grease which spatters from the food will lodge upon the inner surface of the dome portion 3 and side wall portion 2 and may flow downwardly along this inner wall and be deposited in the pan.

The bead 4 thus performs two functions: that of generally centering the pan cover on the pan and that of providing a dripping point for the grease so that it will not seep outwardly under the flange portion 1.

By providing the side wall portion 2 and dome 3, the perforations 3 in the upper part of the cover are spaced a considerable distance from the food in the pan whereby there is less liability that small spattering matter may escape through the perforations 6.

A handle 10 may be provided in the form of a button or the like of wood or like heat non-conducting material secured to the dome portion 3 by a bolt 11 projected through a central perforation in the dome, and having a nut 12 on the under surface of the dome.

Various attempts have been made heretofore to provide covers of this general class, but applicant is the first to simplify the construction to such a point that it can be manufactured and sold at such a low price as to find distribution for it in the low priced chain stores ordinarily known as the five and ten cent stores.

Applicant is thus the first to provide a pan cover of this general class for general use. This results from the fact that all of the essential parts of the cover, including the side walls 2, the dome 3, the flange 1 and the bead 4, may all be produced from flat sheet metal by a single forming stroke of a machine press.

Additionally to the foregoing advantages, it will be observed that all parts of the cover may be readily cleaned, inside and out.

It will be understood by those skilled in the art that the metal will draw most in the side wall 2. Where it is desired to draw the side wall 2 out of a sheet of metal in the plane of the flange 1, it is desirable that the male and female portions of the press-forming die, at the end of the drilling stroke, have a tight fit sliding drawing movement relative to each other. This may best be effected by a side wall portion 2 of frusto-conical form as distinguished from a generally dome form.

Thus, the frusto-conical form of the side wall 2 contributes to the cheapness of manufacture of the cover, as above described.

In this connection also, it will be observed that the frusto-conical portion 2 joins the dome portion 3 by a corner portion of relatively large radius, shown at 13. By this means, the relatively large area of the sheet in contact with the dies at the rounded edge portion 13, permits the exertion of a greater drawing force on the frusto-conical wall portion 2 without liability of severing the sheet metal at the shoulder portion 13 which might result if it were a relatively sharp edge.

Thus it will be observed generally that the features of construction of the cover of my invention adapt it not only to perform its functions when made and in use as a cover but adapt it to the die drawing process by which it is made whereby it may be made with the very minimum of cost.

My invention is not limited to the exact details of construction described and illustrated. Many changes and modifications may be made within the scope and spirit of my invention and without sacrificing its advantages.

I claim:

1. A sheet metal cover for pans and the like of generally circular plan comprising a perforated substantially flat dome portion terminating in a downwardly curved peripheral portion, a frusto-conical side portion of substantial height joining the curved portion and supported on a generally horizontal laterally extending circular flange portion, and comprising a downwardly extending circular bead on the flange portion intermediate the flange periphery and the frusto-conical side portion.

2. A sheet metal cover for pans and the like comprising a perforated substantially flat dome portion, a frusto-conical side portion of substantial height joining the dome portion and supported on a generally horizontal flange portion, and comprising a downwardly extending bead on the flange portion intermediate the flange periphery and the frusto-conical side portion.

ESTEN U. ROLAND.